(Model.)

C. E. HATCH.
COMBINED BLACKING BRUSH AND SCRAPER.

No. 330,111. Patented Nov. 10, 1885.

WITNESSES:
INVENTOR:
C. E. Hatch
BY
ATTORNEYS.

UNITED STATES PATENT OFFICE.

CHARLES E. HATCH, OF VALLEJO, CALIFORNIA.

COMBINED BLACKING-BRUSH AND SCRAPER.

SPECIFICATION forming part of Letters Patent No. 330,111, dated November 10, 1885.

Application filed September 5, 1884. Serial No. 142,276. (Model.)

*To all whom it may concern:*

Be it known that I, CHARLES E. HATCH, of Vallejo, in the county of Solano and State of California, have invented a new and Improved Combined Blacking-Brush and Scraper, of which the following is a full, clear, and exact description.

Reference is to be had to the accompanying drawings, forming a part of this specification, in which similar letters of reference indicate corresponding parts in all the figures.

Figure 1:
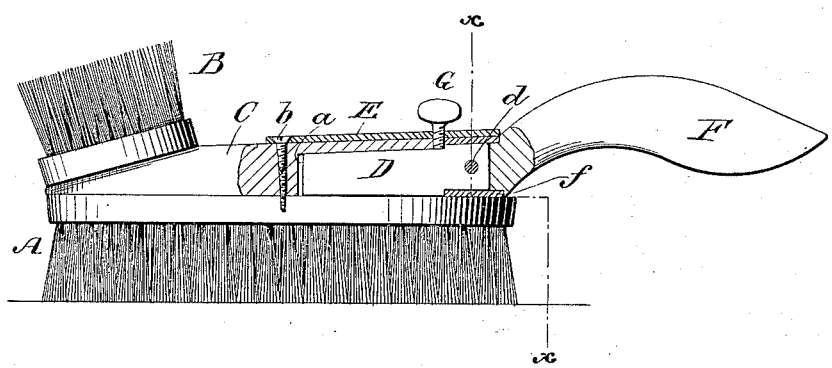
Figure 2:
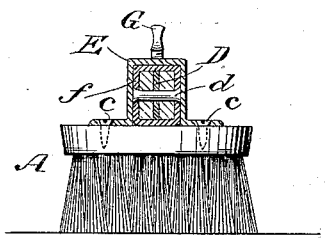
Figure 3:
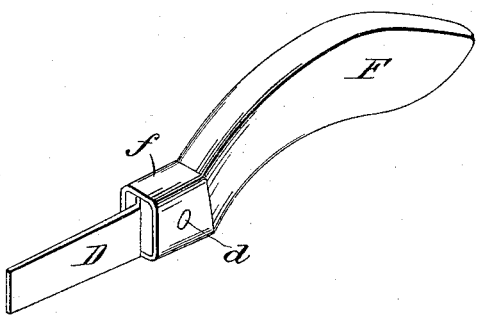

Figure 1 is a partly sectional elevation of my invention. Fig. 2 is a transverse sectional elevation taken on the line $x\,x$ of Fig. 1, and Fig. 3 is a perspective view of the handle with scraper attached removed from the blacking-brush.

The invention will first be described in connection with the drawings, and then pointed out in the claims.

In the drawings, A represents the main body of the brush, which may be of the ordinary or of any approved construction, and B represents the ordinary "wiper-brush" secured upon the forward end of the bar or rib C, secured upon the main body A of the brush. The rib C is formed with the slot $a$ to receive the scraping or cleaning blade D, and the rib is held at its forward end to the main body A of the brush by the same screw that holds the wiper-brush B in place. At its rear end the rib C is held to the body A by the screw $b$ and the screws $c\,c$ that secure the sheath in place. The blade D is attached to the handle F of the brush by the pin $d$, and the handle F is provided with the ferrule $f$, which is of such size relative to the size of the sheath-plate E as to be adapted to fit within its outer or rear end, as shown in Figs. 1 and 2. In the upper surface of the sheath E is fitted the set-screw G, arranged for holding the handle F and blade D securely within the sheath E for making a secure attachment of the handle to the brush when it is desired to use the device as a brush.

When it is desired to use the blade D for scraping the mud or dirt from the boots or shoes before applying the blacking, it is only necessary to loosen the set-screw G and withdraw the handle F and blade D from the rib C and sheathing E, when the handle and blade furnish a most convenient device for that purpose. The mud having been removed from the boots or shoes, the blade and handle are to be replaced within the rib C and sheathing E and secured by turning down the set-screw G, thus making the device ready again to be used as a brush. In this manner it will be seen that the scraper and brush are always at hand ready for use, and that the device as a whole is cheap, practical, and convenient.

Having thus described my invention, I claim as new and desire to secure by Letters Patent—

1. The combination, with a blacking-brush, of the detachable handle F, provided with a scraper or blade, substantially as and for the purposes set forth.

2. The body A of the brush provided with the rib C, having slot $a$, and the sheathing E, in combination with the handle F, provided with blade D, the sheathing E being provided with set-screw G, substantially as and for the purposes set forth.

CHARLES E. HATCH.

Witnesses:
  C. G. FERGUSON,
  B. E. BARWISE.